United States Patent Office 3,415,717
Patented Dec. 10, 1968

3,415,717
BACTERIURIA TEST PAPERS
Souren Avakian, Westport, Conn., assignor, by mesne assignments, to Denver Chemical Manufacturing Company, Stamford, Conn., a corporation of Connecticut
No Drawing. Filed Nov. 7, 1966, Ser. No. 592,262
4 Claims. (Cl. 195—100)

This invention relates to bacteriuria test papers and more particularly, to test papers for detecting certain bacteria in urine. Griess found that certain bacteria could be detected in water supplies by the production of a red color in the presence of nitrite by addition of an acidic sulfanilic acid-α-naphthylamine reagent [Griess, P., Ber. deutsch chem. Gesellsch. 12 426–428 (1879)].

The use of the Griess test in detecting bacteria is based on the observation that coli, proteus and staphylococci reduce the nitrate ion to nitrite. Inconstant nitrite producers are nicrocci, Gärtner-bacillus and the Salmonella group. The Griess test serves as an extremely rapid method of detection of urinary infection.

However, the operational drawback of the Griess test is the instability of the reagents. The combined reagent after several weeks develops a pink color, which makes it unusable.

In accordance with this invention, bacteriuria test papers are produced which are stable over long periods of time and which detect the presence of bacteria in urine, thus providing a simple and routine test for diagnosis of urinary infection. The bacteriuria test papers are prepared by impregnating paper or paper-like material such as filter paper, e.g., Whatman #1, or glass fiber chromatography media, e.g., Gelman I.T.L.C. type S.G., with a solution containing the following components, desirably in the proportions indicated:

| | Parts by wt. |
|---|---|
| Diazotizable amine | 1 |
| Coupling agent | 2–3 |
| Solid carboxylic acid | 9–15 |

The solvent for the components is desirably a relatively low boiling anhydrous organic solvent such as methanol or ethanol. Examples of diazotizable amines are the sulfonamides (e.g., sulfanilamide, sulfadiazine etc.), 2,5-dichloroaniline, sulfanilic acid, p-arsanilic acid, p-nitroaniline, and (4-aminophenyl) trimethyl-ammonium ion. Examples of coupling agents are the N,N-dialkyl-1-naphthylamines (e.g., N,N-dimethyl-1-naphthylamine, N,N-diethyl-1-naphthylamine), N-(1-naphthyl)-ethylenediamine, 1-naphthylamine, and 1-naphthyamine-8-sulfonic acid. Examples of solid carboxylic acids are the hydroxy-carboxylic acids (e.g., citric, tartaric acids, and the malic acids) and the dicarboxylic acids (e.g., malonic, succinic, glutaric and adipic acids).

After impregnation, the paper is rapidly dried and stored in air-tight bottles. Desirably, a suitable desiccant is placed in the bottles with the paper. The bottles are tightly closed and kept away from moisture. Excessive exposure to light is avoided. In testing the urine, a drop of urine is spotted on the test paper. In a positive test a color ranging from light pink to dark purple will develop. In a negative test there will be no change in the color of the paper. Examination should be made within 30 seconds.

Urines giving a negative test should be treated as follows:

To 1 ml. of urine, 2 drops of a 5% aqueous potassium nitrate solution are added. The mixture is then incubated at 37° C. for one hour or at room temperature for four hours. A drop of the incubated urine is spotted on the bacteriuria test paper and examined for color within 30 seconds. A negative test following incubation with potassium nitrate indicates the absence of nitrate-reducing bacteria.

The intensity of color produced in a positive test may be indicative of the severity of infection.

A more comprehensive understanding of this invention is obtained by reference to the following example:

Example 0.5 g. of sulfanilamide, 1.2 ml. (approximately 1.25 g.) of N,N-dimethyl-1-naphthylamine and 6.0 g. of anhydrous citric acid are dissolved in anhydrous methanol to obtain a 100 ml. solution. This solution is employed to impregnate filter paper such as Whatman #1. The paper is then rapidly dried and stored in air-tight bottles.

The resulting test paper is employed as heretofore described by adding a drop of the urine to the test paper. Coloring of the test paper develops immediately in urine samples containing bacteria. The findings with the bacteriuria test papers of this invention with different urine samples were the same as those obtained by the conventional Griess test.

The proportions given in the description and claims of this invention are by weight.

What is claimed is:

1. A bacteriuria test paper comprising paper impregnated with a sulfonamide, an N,N-dialkyl-1-naphthylamine, and an acyclic hydroxy polycarboxylic acid, in which the approximate proportions of said components are 1 part of a sulfonamide, 2 to 3 parts of an N,N-dialkyl-1-naphthylamine, and 9 to 15 parts of an acyclic hydroxy polycarboxylic acid.

2. A bacteriuria test paper in accordance with claim 1 in which the components and their proportions are 1 part of sulfanilamide, 2 to 3 parts of N,N-dimethyl-1-naphthylamine and 9 to 15 parts of citric acid.

3. A bacteriuria test paper in accordance with claim 1 in which the components and their approximate proportions are 1 part of sulfanilamide, 2.5 parts of N,N-dimethyl-1-naphthyamine and 12 parts of citric acid.

4. A bacteriuria test paper in accordance with claim 1 in which the components and their proportions are 1 part of 2,5-dichloroaniline, 2 to 3 parts of N,N-dimethyl-1-naphthyamine and 9 to 15 parts of citric acid.

References Cited

UNITED STATES PATENTS 3,122,480  2/1964  Turner et al. _____ 195—103.5
3,149,054  9/1964  Ryan _____ 195—103.5

ALVIN E. TANENHOLTZ, Primtry Examiner.

U.S. Cl. X.R.
195—100; 252—195